United States Patent [19]

Kubota

[11] 4,163,279

[45] Jul. 31, 1979

[54] DERIVATIVE MINOR LOOP TYPE CONTROLLER

[75] Inventor: Tomiharu Kubota, Numazu, Japan

[73] Assignee: Kabushiki Kaisha Meidensha, Tokyo, Japan

[21] Appl. No.: 880,005

[22] Filed: Feb. 21, 1978

[30] Foreign Application Priority Data

Feb. 23, 1977 [JP] Japan .................... 52/19009

[51] Int. Cl.² .................... G06G 7/66; G05B 11/42
[52] U.S. Cl. .................... 364/105; 318/610; 364/118
[58] Field of Search .............. 364/105, 114, 118, 117; 318/609, 610, 621

[56] References Cited

U.S. PATENT DOCUMENTS

| | | | |
|---|---|---|---|
| 2,946,943 | 7/1960 | Nye et al. | 318/610 X |
| 3,391,316 | 7/1968 | Ross | 364/105 X |
| 3,628,129 | 12/1971 | Riley | 318/610 X |
| 3,646,454 | 2/1972 | Southern | 364/118 X |
| 3,699,989 | 10/1972 | O'Connor et al. | 318/609 X |
| 3,770,946 | 11/1973 | Fertik et al. | 318/610 X |
| 3,967,862 | 7/1976 | Hunter et al. | 318/609 X |

*Primary Examiner*—Joseph F. Ruggiero
*Attorney, Agent, or Firm*—Haseltine, Lake & Waters

[57] ABSTRACT

A controller for controlling a controlled system in connection with detecting means which detects the output of the controlled system and feedbacks a corresponding detected signal to the controller. The controller comprises proportional amplifying means for amplifying the error between a reference input signal and the detected signal, proportional and/or integral amplifying means for proportionally amplifying and/or integrating the error between the output of the proportional amplifying means and another signal to provide the resulting output as manipulating signal to the controlled system and derivative amplifying means for differentiating and amplifying the detected signal to provide the resulting output as the other input signal to the proportional and/or integral amplifying means whereby the controlled system is controlled in an overshooting-free mode.

9 Claims, 13 Drawing Figures

DERIVATIVE MINOR LOOP TYPE CONTROLLER

BACKGROUND OF THE INVENTION

This invention relates to a controller such as a proportional plus integral, or proportional plus integral plus differential, controller for controlling a controlled system in connection with detecting means for detection of the output of the controlled system to provide a corresponding feedback signal to the controller.

Conventional process or other type control systems include a controller of the type mentioned above. If consideration is given to such a control system which is composed of a proportional plus integral action controller associated with a controlled system and detecting means which detects the output or controlled variable of the controlled system and imparts a corresponding feedback signal to the controller, the output or controlled variable of the controlled system will generally exhibit an decreasing oscillatory overshooting response to a step input signal to the controller. It is pointed out that such decreasing oscillatory response is due mainly to the proportional plus integral action of the controller. That is, after the application of the step input signal, the controller will perform the proportional and integral action on the error input as the difference between the step input signal and the feedback signal. Thus, even when the error or proportional input becomes zero, that is, even when the output of the controlled system reaches its desired value, the integrated output component of the controller remains thereby causing an overshoot. After the occurrence of the overshooting, the error is inverted in sign and the overshoot increases until the integrated output component and the error become equal to and are cancelled by each other.

SUMMARY OF THE INVENTION

It is therefore an object of this invention to provide a controller which completely prevents an overshoot in the output of a controlled system and operates in a safe mode.

Another object of this invention is to provide a controller of relatively inexpensive simple structure which completely prevents an overshoot in the output of a controlled system and operates in a safe mode.

According to this invention, there is provided a controller for controlling a controlled system in connection with detecting means which detects the output of said controlled system and feeds back a corresponding detected signal to said controller, said controller comprising first amplifying means for amplifying the error between a reference input signal and the detected signal, second amplifying means for amplifying the error between the output of said first amplifying means and another signal to provide the resulting output as manipulating signal to said controlled system and derivative amplifying means for differentiating and amplifying the detected signal to provide the resulting output as the other signal to the second amplifying means whereby said control system is controlled in an overshooting-free mode.

The second amplifying means may be a proportional and/or integral amplifier.

When a step reference input signal, for example, is applied to the controller, the controller manipulates the controlled system according to the error input to the controller. The error is amplified by the first amplifying means and imparted as an input signal to the second amplifying means. At the same time, the detected output of the controlled system is differentiated with respect to time by the derivative amplifying means and imparted to the second amplifying means. Since the second amplifying means performs an integral action on its input, the controller operates so that the error input signal and the differentiated output of the detecting means coincide. Thus, if the controlled system is manipulated such that the differentiated detected output gradually increases, the first amplifying means gives to the second amplifying means the instructions that the second amplifying means should act according to the differentiated detected output. When the output of the controlled system gradually approaches its desired value and the differentiated detected output reaches a maximum value, the first amplifying means gives to the second amplifying means the instructions that the second amplifying means should act according to the maximum differentiated detected output. The second amplifying means accordingly acts and manipulates the controlled system. As the output of the controlled system then approaches the desired value, the error signal imparted to the controller gradually approaches zero whereby the output of the first amplifying means decreases more than before. Thus, the output of the second amplifying means imparted to the controlled system gradually decreases whereby the manipulating output acting on the controlled system rapidly decreases and thence the output of the controlled system gradually approaches the desired value. When the level of the detected signal reaches the reference input signal to the controller, the output of the first amplifying means becomes zero. Accordingly, the controlled system is controlled so that the output of the derivative amplifying means and therefore the rate of change of the detected output of the controlled system become zero, thereby causing the output of the controlled system to reach the desired value without resulting in an overshooting.

A suitable limiter may be provided at the output of at least one of the first and second amplifying means mentioned above whereby the rate of change of the detected output can be changed with respect to time in a desired pattern by changing the limiting level of the limiter. This can bring about a gentle change in the reference input signal as with the conventional proportional plus integral, or proportional plus integral plus derivative, controller. It will also bring about a gentle change in the detected output in spite of a large change in the reference input signal without using other additional elements.

If the controlled system has an integrating function, the second amplifying means may be a proportional amplifier.

BRIEF DESCRIPTION OF THE DRAWINGS

The prior art and this invention will now be described with reference to the accompanying drawings in which.

The elements denoted by the same reference numeral through the drawings have the same or similar functions.

DETAILED DESCRIPTION OF THE PRIOR ART CONTROLLERS

Figure 1A:
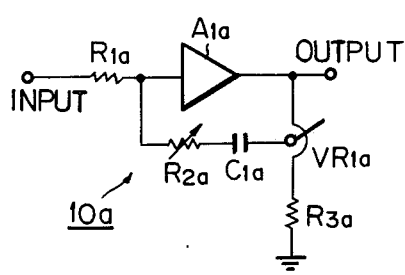
FIG. 1A schematically shows a prior art proportional plus integral amplifying controller.
Figure 1B:
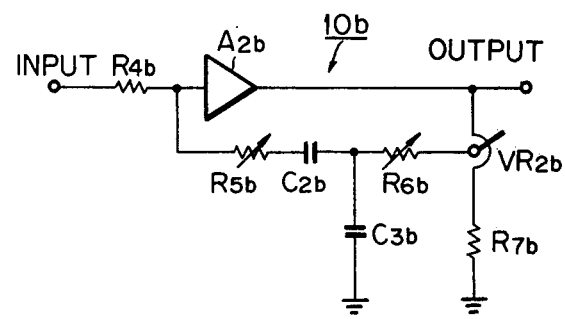
FIG. 1B schematically shows a prior art proportional plus integral plus derivative amplifying controller.

Prior art controllers will be described for the purpose of facilitating the understanding of this invention. Referring to FIG. 1A, there is shown a typical prior art proportional and integral (referred to as PI hereinafter) amplifying controller $10a$ wherein a high gain amplifier $A_{1a}$ which receives an input signal through an input resistor $R_{1a}$, a feedback impedance including an integral time adjusting resistor $R_{2a}$, an integral capacitor $C_{1a}$ and a proportional gain adjusting resistor $VR_{1a}$ connected in series and connecting the input and output of the amplifier, and an auxiliary resistor $R_{3a}$ connecting the resistor $VR_{1a}$ and ground. In FIG. 1B, a typical prior art proportional plus integral plus derivative (referred to as PID hereinafter) amplifying controller $10b$ includes a high gain amplifier $A_{2b}$ having an input resistor $R_{4b}$, a feedback impedance including an integral time adjusting resistor $R_{5b}$, an integral capacitor $C_{2b}$, a differential time adjusting resistor $R_{6b}$ and a proportional gain adjusting resistor $VR_{2b}$ connected in series and connecting the input and output of the amplifier $A_{2b}$, a differential capacitor $C_{3b}$ connected between ground and a common junction point between the capacitor $C_{2b}$ and the resistor $R_{6b}$. These controllers are based upon the PI amplifying controller, shown in FIG. 2, which is composed of an input resistor $R_1$, a high gain amplifier A connected to the resistor $R_1$, a feedback impedance consisting of a resistor $R_2$ and an integral capacitor $C_2$ connected in series and connecting the input and the output of the amplifier. The FIG. 2 controller has an integral time of $R_2 \cdot C$ and a proportional gain of $R_2/R_1$.

Figure 2:
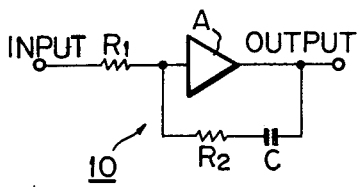
FIG. 2 schematically shows a simplified form of a prior art proportional plus integral amplifying controller.
Figure 3:
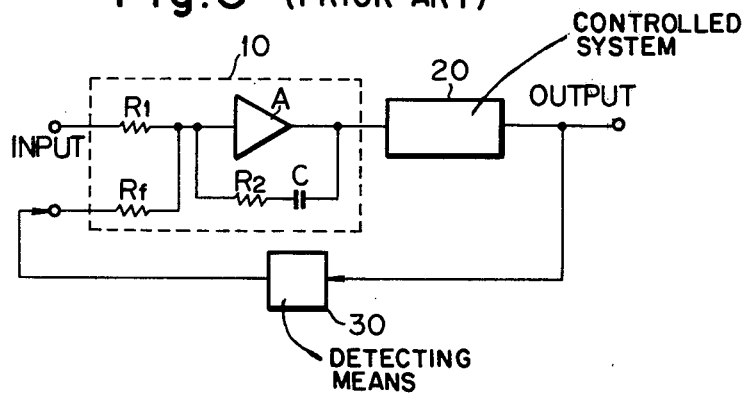
FIG. 3 schematically shows a control system in which the FIG. 2 controller is applied.

In FIG. 3, a prior art process or other type control system includes the controller shown in FIG. 2 and generally indicated by reference numeral 10. The controller 10 controls a controlled system 20 whose output signal such as speed, temperature, frequency or electrical power is detected by detecting means 30 and the detected signal is provided by negative feedback through an input resistor $R_f$ to the controller 10.

Figure 4A:
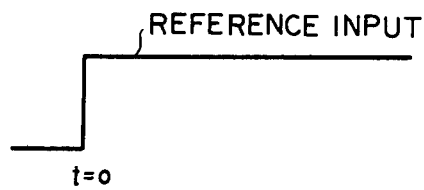
FIG. 4A shows a step input signal into the FIG. 3 controller.
Figure 4B:
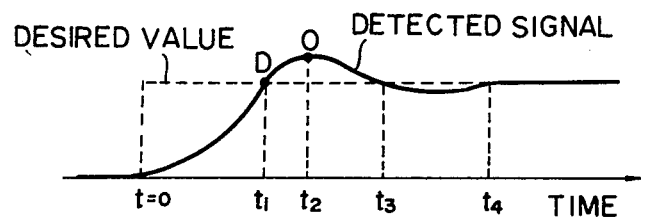
FIG. 4B shows the indicial response of the controlled system in FIG. 3.

When a step reference input signal such as shown in FIG. 4A is applied through the input resistor $R_1$ to the FIG. 3 controller, the controller 10 controls the controlled system 20 so as to reduce to zero the error between the reference input signal and the detected signal: the detected signal of the controlled system 2 increases with time from time $t=0$ and reaches a desired value D at a time of $t_1$, then overshoots the desired value D and reaches a maximum overshooting point 0 at a time of $t_2$.

The detected signal then decreasingly reaches the desired value D at a time of $t_3$, further decreases and then oppositely increases and finally reaches the desired value D at a time of $t_4$. If the main cause of the overshooting of the FIG. 3 controller is considered, it is pointed out that the controller performs a PI action: in addition to a proportional action, the controller 10 performs an integral action on the error input thereto from the time $t=0$ when the step reference input signal is applied to the controller to the time of $t_1$ when the output of the controlled system 20 coincides with the desired value D. Thus, although the proportional output component from the controller 10 is zero, the integral output component thereof can remain at the point of D corresponding to the time $t_1$, which will cause an overshooting. The overshooting caused after the time $t_1$ increasingly reaches the maximum overshooting point 0 at a time $t_2$ where the proportional output component is equal in magnitude and opposite in polarity to the integral output component.

DETAILED DESCRIPTION OF THE INVENTION

Figure 5A:
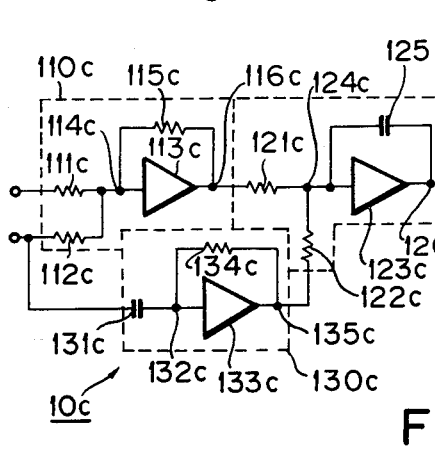
FIG. 5A schematically shows a preferred embodiment of a controller according to this invention.

A preferred embodiment of this present invention will now be described. Referring to FIG. 5A, the controller $10c$ of this invention includes a proportional amplifying means $110c$ which consists of a reference signal input resistor $111c$, a feedback signal input resistor $112c$, a high gain amplifier $113c$ having an input terminal $114c$ electrically connected to the reference and feedback signal input resistors $111c$ and $112c$ and a proportional resistor $115c$ connecting the input terminal $114c$ and an output terminal $116a$ of the amplifier. The controller further includes an integral amplifying means $120c$ which consists of an input resistor $121c$ electrically connected at one end to the output terminal of the proportional amplifying means $110c$, a feedback input resistor $122c$, a high gain amplifier $123c$ having an input terminal $124c$ electrically connected to the other end of the input resistor $121c$ and one end of the feedback input resistor $122c$ and an integral capacitor $125c$ electrically connecting the input terminal and an output terminal $126c$ of the amplifier. The controller further includes a derivative amplifying means $130c$ which consists of a capacitor $131c$ electrically connecting the feedback signal input from a detecting means with an input terminal $132c$ of a high gain amplifier $133c$, and a derivative resistor $134c$ electrically connecting the input terminal and an output terminal $135c$ of the amplifier which is electrically connected to the feedback input resistor $122c$ of the integral amplifying means $120c$.

Figure 5B:
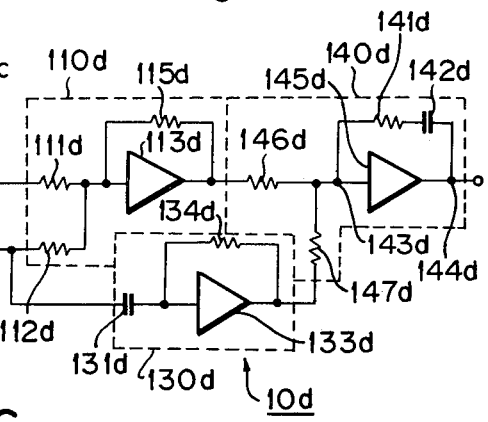
FIG. 5B schematically shows a modification of the controller according to this invention.

The modification of FIG. 5B can be obtained by replacing the FIG. 5A integral amplifying means $120c$ with a proportional plus integral amplifying means $140d$ which includes a feedback impedance consisting of a proportional resistance $141d$ and an integral capacitor $142d$ connected in series and electrically connecting an input terminal $143d$ and an output terminal $144d$ of a high gain amplifier $145d$. The amplifying means $140d$ further includes an input resistor $146d$ for receiving the output of the proportional amplifying means $110d$ and another input resistor $147d$ for receiving the output of the derivative amplifying means $130d$. The FIG. 5A controller may be applied to constitute a control system, as shown generally by reference numeral $10c$ in FIG. 6, which controls a controlled system 20 whose output is provided by negative feedback through a detecting means 30 to the controller, that is, to the input resistor 112c of the amplifying means 110c. The FIG. 5B controller may be applied to a similar control system in the same way as shown in FIG. 6.

Figure 6:
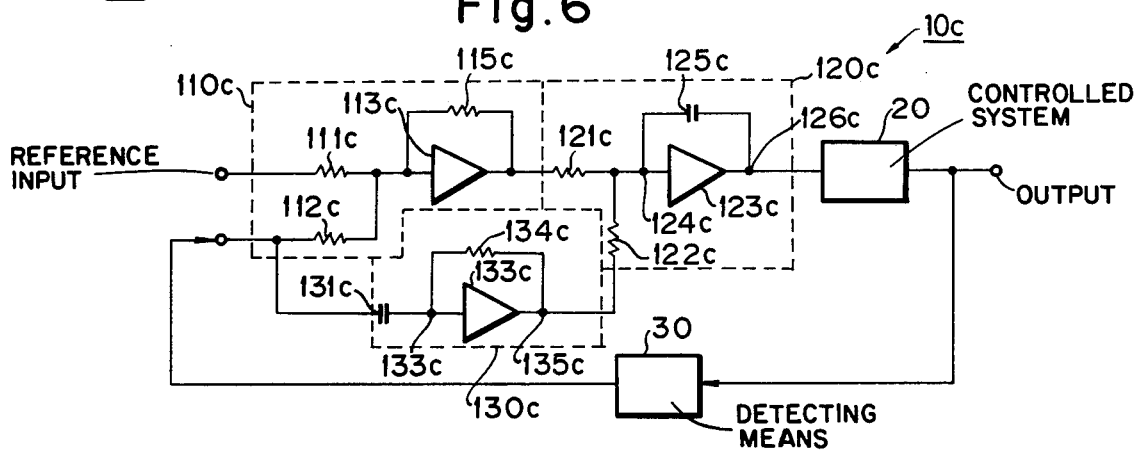
FIG. 6 schematically shows a control system in which this invention is incorporated.
Figure 7A:
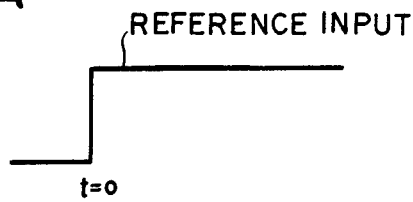
FIG. 7A shows a step input signal applied to the FIG. 6 control system.

In operation, when a step reference input signal, as shown in FIG. 7A, is applied to the controller of FIG. 6, the controlled system 20 is driven according to the manipulating signal from the controller. If the controlled system 20 is a rotary electric machine and the detecting means 30 detects the speed of rotation of the controlled system 20, the derivative amplifying means 130c will detect the acceleration of the controlled system 20. The error between the reference input signal and the detected speed is amplified by the proportional amplifying means 110c and imparted to the integral amplifying means 120c. A change in the detected speed, that is, an acceleration is obtained from the derivative amplifying means 130c and applied as the detected signal to the integral amplifying means 120c. The integral amplifying means 120c performs an integrating action so that the error signal and the detected acceleration coincides with each other. Thus, when the controlled system 20 is accelerated, the detected acceleration gradually increases. The proportional amplifying means 110c gives to the integral amplifying means 120c the instructions that the integral amplifying means 120c should act according to the detected acceleration.

Figure 7B:
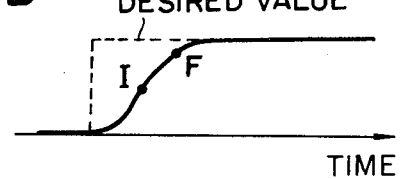
FIG. 7B shows the indicial response of the controll system in FIG. 6.

The detected acceleration reaches a maximum value at a point of I shown in FIG. 7B. When the detected acceleration is then reaching a point of F, the error gradually approaches zero and the output of proportional amplifying means 110c decreases. Thus, the output of the integral amplifying means 120c gradually decreases whereby the acceleration torque acting on the controlled system 20 rapidly decreases and the speed of rotation of the controlled system 20 gradually approaches the desired value. When the detected level of speed reaches the reference signal level, the output of the proportional amplifying means 110c becomes zero. Thus, the controlled system 20 is controlled so that the output of the derivative amplifying means 130c, i.e. the rate of change of the detected speed may be zero thereby resulting in reaching the desired value without creating an overshooting.

Figure 8A:
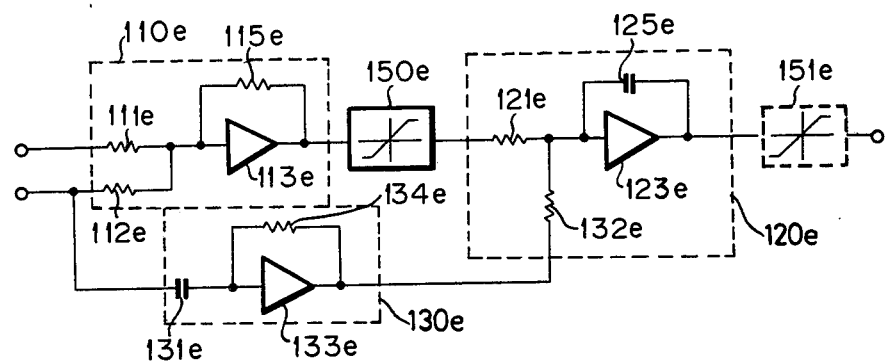
FIGS. 8A and 8B schematically shows further modifications, respectively, of this invention.
Figure 8B:
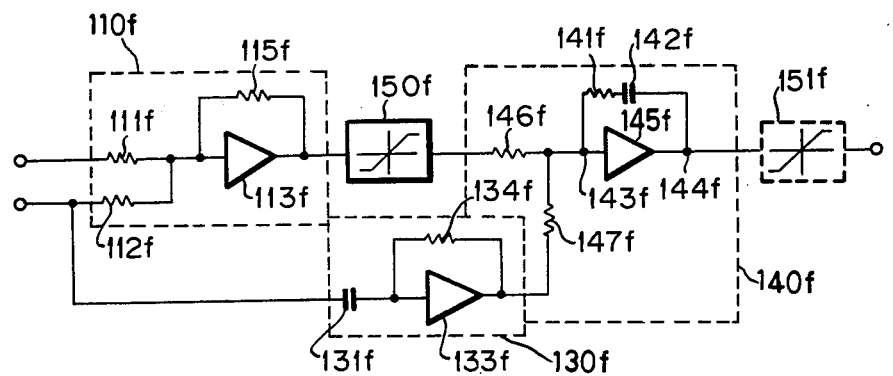

A second modification of this invention is shown in FIG. 8A wherein a limiter 150e is provided at the output of the proportional amplifying means 110e. The limiter can change the rate of change of the detected variable with respect to time in a predetermined mode by adjusting the limiting level of the proportional amplifying means 110e. This can gradually change the magnitude of the reference input signal with respect to time as in the prior art PI or PID controller. The limiter can gradually change the magnitude of the detected variable without using other additional elements although the reference input signal changes rapidly. Such a limiter may be instead or additionally disposed between the controller and the controller system, as shown in a broken line 151e. A third modification of this invention is shown in FIG. 8B wherein one or both of limiters 150f and 151f are correspondingly disposed at one or both of the outputs of a proportional amplifying means 110f and a proportional plus integral amplifying means 140f of a controller similar to the FIG. 5B controller.

In the above embodiment and modifications of this invention, if the controlled system 20 has an integral function, the amplifying means 120c or 140d may be of proportional action.

According to this invention, the amplifying means 120c or 140d operates with a substantially zero input thereto, thereby to result in easily obtaining a constant maximum rate of change or a zero overshoot of the detected output which can not be obtained with the prior art controller. If the derivative amplifying means 130c of the FIG. 6 control system should be replaced with a prior art derivative circuit consisting of a resistor and a capacitor, the control system thus obtained would exhibit an overshooting in its controlled variable because a considerable amount of an electric charge would be kept on the derivative circuit during the settling time.

It will be noted that the derivative amplifying means 130c and 130d in FIGS. 5A and 5B will function as a minor loop in a control system. A simple addition of the derivative amplifying means 130c or 130d as the minor loop to the combination of the proportional amplifying means 110c or 110d and the proportional amplifying means 120c or the proportional plus integral amplifying means 140d serves to reduce the cost of the controller of this invention.

The above particular embodiment and modifications of this invention are shown as consisting of analogue control elements. However, the FIGS. 5A and 5B respective amplifying means may be replaced with digital computers, or with combinations of other digital control elements which have the same principle of operations and the same effect as the FIGS. 5A and 5B amplifying means.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims and therefore intended to be embraced therein.

What is claimed is:

1. A controller for controlling a controlled system in connection with detecting means which detects the output of said controlled system and feeds back a corresponding detected signal to said controller such that a reference input signal to said controller and the fed-back detected signal coincide with each other, said controller comprising first amplifying means for amplifying the error between a reference input signal and the detected signal, second amplifying means for amplifying the error between the output of said first amplifying means and another signal to provide the resulting output as manipulating signal to said controlled system, and first-linear derivative amplifying means for differentiating with respect to time in a first-linear derivative manner and amplifying the detected signal to provide the resulting output as the other signal to the second amplifying means whereby, during the time when the error between the reference input signal and the magnitude of the detected and fed-back signal is relatively large, control is made such that the value of the first-linear derivative of the detected and fed-back signal is constant in an overshooting-free mode.

2. The controller according to claim 1, further including a limiter disposed on at least one of the outputs of said first and second amplifying means for limiting the rate of change of the detected signal with respect to time.

3. A controller for controlling a controlled system in connection with detecting means which detects the output of said controlled system and feeds back a corresponding detected signal to said controller, said controller comprising first amplifying means for amplifying the error between a reference input signal and the detected signal, second amplifying means for amplifying the error between the output of said first amplifying means and another signal to provide the resulting output as manipulating signal to said controlled system, and derivative amplifying means for differentiating and amplifying the detected signal to provide the resulting output as the other signal to the second amplifying means whereby said control system is controlled in an overshooting-free mode; said second amplifying means being a proportional amplifier whereby said controller effects a proportional plus derivative action.

4. A controller for controlling a controlled system in connection with detecting means which detects the output of said controlled system and feeds back a corresponding detected signal to said controller, said controller comprising first amplifying means for amplifying the error between a reference input signal and the detected signal, second amplifying means for amplifying the error between the output of said first amplifying means and another signal to provide the resulting output as manipulating signal to said controlled system, and derivative amplifying means for differentiating and amplifying the detected signal to provide the resulting output as the other signal to the second amplifying means whereby said control system is controlled in an overshooting-free mode; said second amplifying means being an integral amplifier whereby said controller effects a proportional plus integral plus derivative action.

5. A controller for controlling a controlled system in connection with detecting means which detects the output of said controlled system and feeds back a corresponding detected signal to said controller, said controller comprising first amplifying means for amplifying the error between a reference input signal and the detected signal, second amplifying means for amplifying the error between the output of said first amplifying means and another signal to provide the resulting output as manipulating signal to said controlled system, and derivative amplifying means for differentiating and amplifying the detected signal to provide the resulting output as the other signal to the second amplifying means whereby said control system is controlled in an overshooting-free mode; said second amplifying means being a proportional plus integral amplifier whereby said controller effects a proportional plus integral plus derivate action.

6. A controller for controlling a controlled system in connection with detecting means which detects the output of said controlled system and feeds back a corresponding detected signal to said controller, said controller comprising first amplifying means for amplifying the error between a reference input signal and the detected signal, second amplifying means for amplifying the error between the output of said first amplifying means and another signal to provide the resulting output as manipulating signal to said controlled system, and derivative amplifying means for differentiating and amplifying the detected signal to provide the resulting outout as the other signal to the second amplifying means whereby said control system is controlled in an overshooting-free mode; said first amplifying means comprising an input resistor through which the reference input signal passes and another input resistor through which the detected signal passes, a first high gain amplifier having an input terminal electrically connected to said input resistors and an output terminal, and a feedback resistor electrically connecting the input and output terminals of said first high gain amplifier, said second amplifying means comprising an input resistor through which the output signal from said first amplifying means passes, another input resistor through the output signal from said derivative amplifying means passes, a second high gain amplifier having an input terminal electrically connected to said input resistors and an output terminal and a feedback capacitor electrically connecting the input and output terminals of said second amplifier, said derivative amplifying means comprising a capacitor through which the detected signal passes, a third high gain amplifier having an input terminal electrically connected to said capacitor and an output terminal electrically connected to said other input resistor of said second smplifying means, and a feedback resistor electrically connecting the input and output terminals of said third amplifier.

7. The controller according to claim 6, further including a limiter disposed on at least one of the output terminals of said first and second amplifying means for limiting the rate of change of the detected signal with respect to time.

8. A controller for controlling a controlled system in connection with detecting means which detects the output of said controlled system and feeds back a corresponding detected signal to said controller, said controller comprising first amplifying means for amplifying the error between a reference input signal and the detected signal, second amplifying means for amplifying the error between the output of said first amplifying means and another signal to provide the resulting output as manipulating signal to said controlled system, and derivative amplifying means for differentiating and amplifying the detected signal to provide the resulting output as the other signal to the second amplifying means whereby said control system is controlled in an overshooting-free mode; said first amplifying means comprising an input resistor through which the reference input signal passes and another input resistor through which the detected signal passes, a first high gain amplifier having an input terminal electrically connected to said input resistors and an output terminal, and a feedback resistor electrically connecting the input and output terminals of said first high gain amplifier, said second amplifying means comprising an input resistor through which the output signal from said first amplifying means passes, another input resistor through which the output signal from said derivative amplifying means passes, a second high gain amplifier having an input terminal electrically connected to said input resistors and an output terminal and a feedback impedance comprising a capacitor and a resistor connected in series and electrically connecting the input and output terminals of said second amplifier, said derivative amplifying means comprising a capacitor through which the detected signal passes, a third high gain amplifier having an input terminal electrically connected to said capacitor and an output terminal electrically connected to said other input resistor of said second amplifying means, and a feedback resistor electrically connecting the input and output terminals of said third amplifier.

9. The controller according to claim 8, further including a limiter disposed on at least one of the output terminals of said first and second amplifying means for limiting the rate of change of the detected signal with respect to time.

* * * * *